(12) United States Patent
Lee (10) Patent No.: US 10,978,965 B2
(45) Date of Patent: Apr. 13, 2021

(54) TRIBOELECTRIC GENERATOR

(71) Applicant: Lintec of America, Inc., Richardson, TX (US)

(72) Inventor: Jaeah Lee, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 131 days.

(21) Appl. No.: 15/957,087

(22) Filed: Apr. 19, 2018

(65) Prior Publication Data

US 2018/0316281 A1 Nov. 1, 2018

Related U.S. Application Data

(60) Provisional application No. 62/491,404, filed on Apr. 28, 2017.

(51) Int. Cl.
*H02N 1/04* (2006.01)
*H02K 35/00* (2006.01)
*H02K 7/116* (2006.01)
*D02G 3/44* (2006.01)
*B82Y 99/00* (2011.01)
*B82Y 40/00* (2011.01)
*B82Y 30/00* (2011.01)

(52) U.S. Cl.
CPC ............... *H02N 1/04* (2013.01); *D02G 3/441* (2013.01); *B82Y 30/00* (2013.01); *B82Y 40/00* (2013.01); *B82Y 99/00* (2013.01); *D10B 2101/122* (2013.01); *D10B 2401/16* (2013.01); *Y10S 977/948* (2013.01)

(58) Field of Classification Search
CPC ........... H02K 35/00; H02K 7/116; H02N 1/04

USPC ......................................... 310/310, 300, 309
See application file for complete search history.

(56) References Cited

U.S. PATENT DOCUMENTS

2010/0327604 A1\* 12/2010 Zhu ........................... F03G 5/06
290/1 R
2012/0141966 A1\* 6/2012 Heyring .................. H02N 99/00
434/301

(Continued)

OTHER PUBLICATIONS

Changsheng Wua et al., "A spring-based resonance coupling for hugely enhancing the performance of triboelectric nanogenerators for harvesting low-frequency vibration energy", Nano Energy, Feb. 2017, vol. 32, Elsevier Ltd., pp. 287-293.

(Continued)

*Primary Examiner* — Jose A Gonzalez Quinones
(74) *Attorney, Agent, or Firm* — Greenblum & Bernstein, P.L.C.

(57) ABSTRACT

A triboelectric generator include at least two yarns, one of which has been infiltrated with a material having a positive triboelectric affinity and one of which has been infiltrated with a material having a negative triboelectric affinity. The at least two yarns are threaded through holes within a disk so that both of the yarns are disposed on both sides of the disk and pass through the holes within the disk. The at least two yarns are helically wrapped (or "coiled") together on both sides of the disk. During uncoiling, the moving contact between the two yarns, infiltrated with materials having opposite triboelectric affinities, causes an electrical charge to develop. The generated electrical charge can be conducted away for use as electricity.

17 Claims, 7 Drawing Sheets

(56) References Cited

U.S. PATENT DOCUMENTS

| | | | | |
|---|---|---|---|---|
| 2014/0084748 | A1* | 3/2014 | Wang | H02N 1/04 310/300 |
| 2015/0152852 | A1* | 6/2015 | Li | D01F 6/00 60/528 |
| 2017/0331397 | A1* | 11/2017 | Kim | H02N 2/18 |
| 2018/0013358 | A1* | 1/2018 | Turng | H02N 1/04 |
| 2018/0145613 | A1* | 5/2018 | Shin | H02N 1/04 |

OTHER PUBLICATIONS

M. Saad Bhamla et al., "Hand-powered ultralow-cost paper centrifuge", Nature Biomedical Engineering, Jan. 10, 2017, vol. 1, Article No. 0009, Macmillan Publishers Limited, pp. 1-7.

Yi Xi et al., "Multifunctional TENG for Blue Energy Scavenging and Self-Powered Wind-Speed Sensor", Advanced Energy Materials, Feb. 17, 2017, vol. 7, Issue 12, Wiley-Vch Verlag GmbH & Co. KGaA, Weinheim, pp. 1-6.

* cited by examiner

TRIBOELECTRIC GENERATOR

TECHNICAL FIELD

The present disclosure relates generally to nanofibers. Specifically, the present disclosure relates to a triboelectric generator.

BACKGROUND

The triboelectric electric effect describes the phenomenon of generating an electrical charge when contacting two different, complementary materials together. Various materials have been characterized for their triboelectric "affinity." The relative affinities for different materials can be found in various published "triboelectric series." Generally, materials are characterized within the triboelectric series as either having a positive triboelectric affinity value or a negative triboelectric affinity value. Positive triboelectric affinity materials generally donate electrons and negative triboelectric affinity materials generally accept electrons. When oppositely signed affinity materials are placed in contact, an electrical charge develops. The further apart materials are from one another within the triboelectric series, the more charge is generated when contacting the materials.

SUMMARY

An example of the present disclosure includes a triboelectric generator comprising a disk having a first side and a second side, the disk defining at least a first through-hole and a second through-hole; a first nanofiber yarn disposed on the first side of the disk, within the first through-hole, and on the second side of the disk, the first nanofiber yarn comprising: a first plurality of nanofibers defining a first plurality of inter-fiber spaces; a first material having a positive triboelectric affinity disposed within the first plurality of inter-fiber spaces; a second nanofiber yarn disposed on the first side of the disk, within the second through-hole, and on the second side of the disk, the second nanofiber yarn comprising: a second plurality of nanofibers defining a second plurality of inter-fiber spaces; and a second material having a negative triboelectric affinity disposed within the second plurality of inter-fiber spaces.

In an embodiment, wherein the first nanofiber yarn and the second nanofiber yarn are helically wrapped together on both of the first side of the disk and the second side of the disk. In an embodiment, wherein at least one of the first nanofiber yarn and the second nanofiber yarn is electrically conductive. In an embodiment, wherein at least some of the first plurality of nanofibers and the second plurality of nanofibers are carbon nanofibers. In an embodiment, wherein neither the first material or the second material are electrically conductive. In an embodiment, wherein the first material having a positive triboelectric affinity includes a positive triboelectric affinity of at least 10 nano Coulombs per Joule. In an embodiment, wherein the first material having a positive triboelectric affinity includes a positive triboelectric affinity of at least 25 nano Coulombs per Joule. In an embodiment, wherein the first material includes polyurethane. In an embodiment, wherein where the first material includes soda glass. In an embodiment, wherein the second material having a negative triboelectric affinity includes a negative triboelectric affinity of at least –10 nano Coulombs per Joule. In an embodiment, wherein the second material having a negative triboelectric affinity includes a negative triboelectric affinity of at least –40 nano Coulombs per Joule. In an embodiment, wherein the second material includes polyethylene terephthalate. In an embodiment, wherein the second material includes polytetrafluroethylene.

An example of the present disclosure includes a kit for a triboelectric generator, the kit including a disk having a first side and a second side, the disk defining at least a first through-hole and a second through-hole; a first nanofiber yarn including: a first plurality of nanofibers defining a first plurality of inter-fiber spaces and a first material having a positive triboelectric affinity disposed within the first plurality of inter-fiber spaces. The example also includes second nanofiber yarn including a second plurality of nanofibers defining a second plurality of inter-fiber spaces and a second material having a negative triboelectric affinity disposed within the second plurality of inter-fiber spaces.

In an embodiment, wherein at least one of the first nanofiber yarn and the second nanofiber yarn is electrically conductive. In an embodiment, wherein at least some of the first plurality of nanofibers and the second plurality of nanofibers are carbon nanofibers. In an embodiment, wherein neither the first material or the second material are electrically conductive.

An example of the present disclosure includes a method for fabricating a triboelectric generator including: providing a first nanofiber yarn including: a first plurality of nanofibers defining a first plurality of inter-fiber spaces and a first material having a positive triboelectric affinity disposed within the first plurality of inter-fiber spaces; providing a second nanofiber yarn including: a second plurality of nanofibers defining a second plurality of inter-fiber spaces and a second material having a negative triboelectric affinity disposed within the second plurality of inter-fiber spaces. The method also includes providing a disk having a first side and a second side, the disk defining at least a first through-hole and a second through-hole. The method also includes disposing the first nanofiber yarn through the first through-hole, disposing the second nanofiber yarn through the second through-hole and helically winding corresponding portions of the first nanofiber yarn and the second nanofiber yarn on the first side of the disk together and helically winding corresponding portions of the first nanofiber yarn and the second nanofiber yarn on the second side of the disk together.

An example of the present disclosure includes a method for using a triboelectric generator including: providing a triboelectric generator including: a disk having a first side and a second side, the disk defining at least a first through-hole and a second through-hole; a first nanofiber yarn filled with a first material having a positive triboelectric affinity; and a second nanofiber yarn filled with a second material having a negative triboelectric affinity. The method also includes helically wrapping the first nanofiber yarn and the second nanofiber yarn together on both of the first side and the second side of the disk; generating triboelectricity by applying a tensile stress to the helically wrapped first nanofiber yarn and second nanofiber yarn and transmitting the generated triboelectricity as an electrical current through at least one of the first nanofiber yarn and the second nanofiber yarn.

BRIEF DESCRIPTION OF THE DRAWINGS

FIG. 8B is a method flow diagram for an example method for using a triboelectric generator to generate electricity, in an embodiment The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Embodiments of a triboelectric generator of the present disclosure include at least two yarns, one of which has positive triboelectric affinity and one of which has negative triboelectric affinity. For instance, one may be infiltrated with a material having a positive triboelectric affinity and one may be infiltrated with a material having a negative triboelectric affinity. The at least two yarns are threaded through holes within a disk so that both of the yarns are disposed on both sides of the disk and pass through the holes within the disk. The at least two yarns are helically wrapped (equivalently described as, twisted, plied or coiled) together on both sides of the disk. The triboelectric generator described herein can generate an electrical current by pulling free ends of the coiled yarns apart from one another (i.e., applying a tensile stress in direction collinear with a longitudinal axis of the yarns). This tensile stress causes the yarns to uncoil. During uncoiling, the moving contact between the two yarns, infiltrated with materials having opposite triboelectric affinities, causes an electrical charge to develop. In embodiments in which the yarns include a conductive component, such as a carbon nanofiber, the generated electrical charge can be conducted away as electrical current.

The rotation of the disk, which is caused initially by the uncoiling of the yarns, has the effect of providing angular momentum to the yarns, causing them to re-coil around one another after the initial uncoiling. This enables the at least two yarns to be repeatedly coiled and uncoiled from one another upon cyclic application and release of the tensile stress. As a result, an electrical charge can be continuously generated.

Because one embodiment of the present disclosure includes the use of nanofiber yarns, and specifically carbon nanofiber yarns, a description of nanofiber yarn fabrication precedes a description of the triboelectric generator itself.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Figure 1:
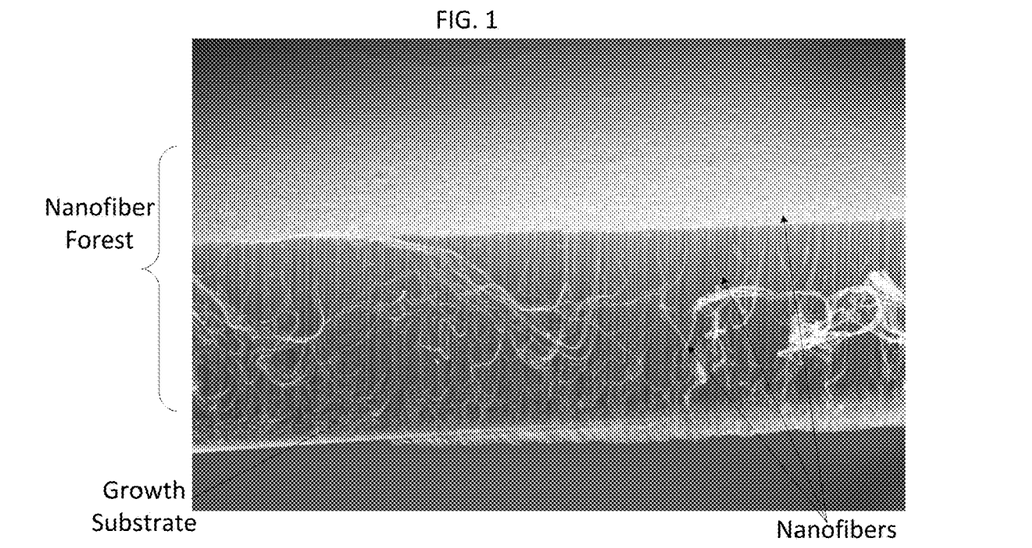
FIG. 1 illustrates an example forest of nanofibers on a substrate, in an embodiment.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Figure 2A:
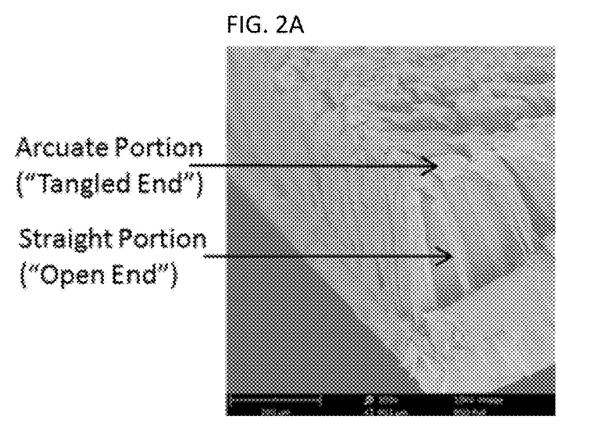
FIG. 2A is a perspective view scanning electron microscope (SEM) image of a carbon nanotube forest (alternatively referred to herein as a "layer") having a plurality of individual nanotubes, each of which includes a straight portion and an arcuate portion, in an embodiment.
Figure 2B:
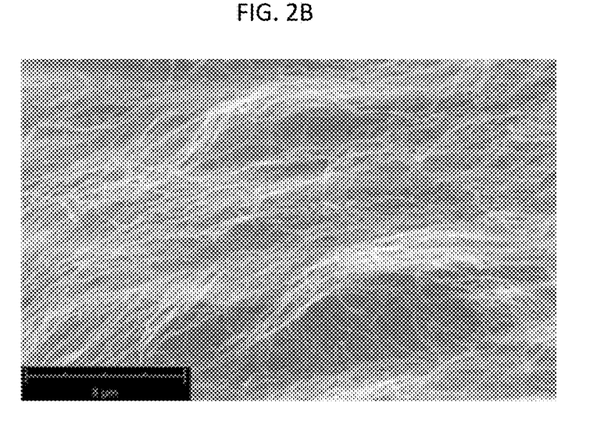
FIG. 2B is a plan view SEM image of a tangled portion composed of arcuate portions of individual nanofibers of a carbon nanotube forest, in an embodiment.

Some embodiments of nanofiber forests include nanofibers that have two portions in their as-deposited form. With reference to FIGS. 2A and 2B, one portion is a "straight portion" (that terminates in an "open end") that connects to, and is disposed near, a growth substrate. The other portion is "an arcuate portion" (also sometimes referred to as a "tangled end") that is disposed at an exposed surface of the nanofiber layer and that bends away from a longitudinal axis of the straight portion. These ends are indicated in the scanning electron microscope (SEM) image of FIG. 2A taken at a magnification of approximately 300× and an accelerating voltage of 10 kV. FIG. 2B' is a top view of a nanofiber layer and shows the tangled nature of the arcuate portions.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Various methods can be used to produce nanofiber precursor forests. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO$_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

The reaction conditions during nanofiber growth can be altered to adjust the properties of the resulting nanofiber precursor forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having desired patterning. For example, in some embodiments catalyst is deposited on the substrate in a pattern and the resulting forest grown from the patterned catalyst is similarly patterned. Example catalysts include iron with a, buffer layer of silicon oxide ($SiO_2$) or aluminum oxide ($Al_2O_3$). These may be deposited on the substrate using chemical vapor deposition (CVD), pressure assisted chemical vapor deposition (PCVD), electron beam (eBeam) deposition, sputtering, atomic layer deposition (ALD), plasma enhanced chemical vapor deposition (PECVD), among others.

In some particular embodiments, multiple nanofiber precursor forests may be sequentially grown on the same substrate to form a multilayered nanofiber forest, alternatively referred to as a "stack."

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
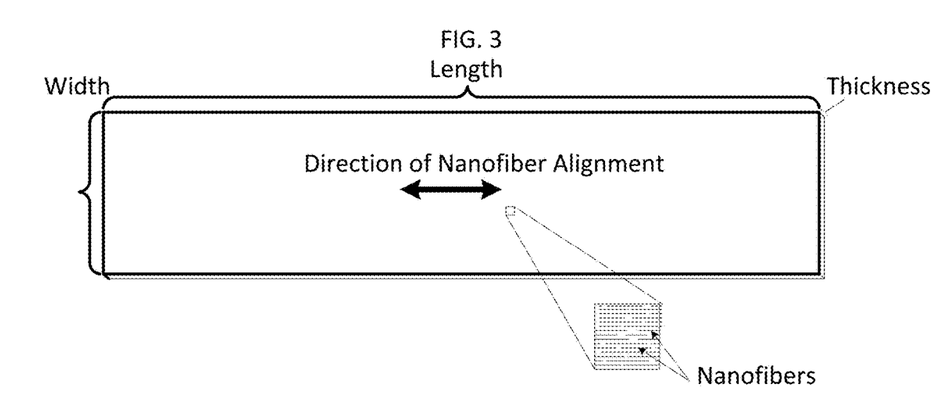
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
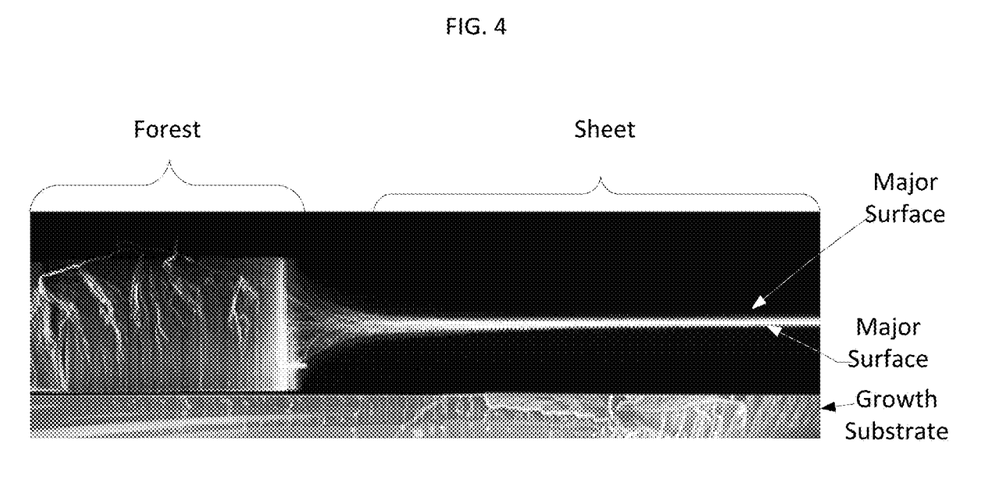
FIG. 4 is an image of a nanofiber sheet being laterally drawn from a nanofiber forest, the nanofibers aligning from end-to-end as schematically shown in FIG. 2.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Triboelectric Generator

As indicated above, embodiments of a triboelectric generator disclosed herein make use of repeated helical winding and unwinding of at least two yarns about one another to generate an electrical current that is conducted through at least one of the yarns. To produce the triboelectric effect, one yarn is infiltrated with a first material having a positive triboelectric affinity and one yarn is infiltrated with a second material having a negative triboelectric affinity. The repeated winding and unwinding of the yarns causes a transfer of electrons between the materials having opposite triboelectric affinities. The transferred electrons can be conducted through one or more of the yarns for use as electricity.

Figure 5A:
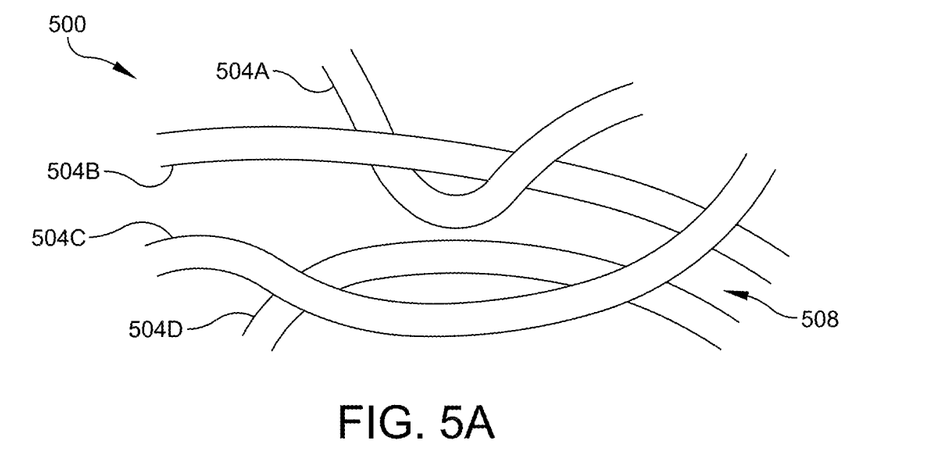
FIG. 5A schematically illustrates an example microstructure of a yarn not infiltrated with a triboelectric material, in an embodiment.
Figure 5B:
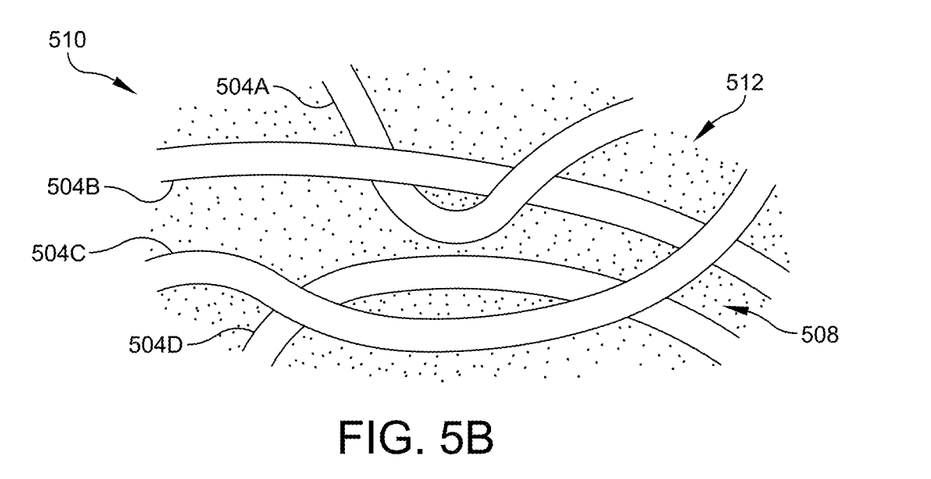
FIG. 5B schematically illustrates an example microstructure of a yarn infiltrated with a triboelectric material, in an embodiment.

FIGS. 5A and 5B schematically illustrate an example microstructure of a yarn not infiltrated and a yarn that is infiltrated with a triboelectric material, respectively, in embodiments of the present disclosure.

FIG. 5A illustrates a portion of a yarn 500 microstructure that is not infiltrated (or otherwise filled) with a triboelectric material, in an embodiment. As illustrated, the yarn 500 includes a plurality of individual fibers 504A-504D that define a plurality of inter-fiber spaces 508. In one embodiment, the constituent individual fibers 504A-504D of the yarn 500 are carbon nanofibers fabricated according to methods described above. In different embodiments, the yarns may include single walled CNTs or multi walled CNTs.

Some benefits of using carbon nanofiber yarns include greater strength, for instance tensile strength, over conventional fibers and yarns. Carbon nanofiber yarns also have very high aspect ratios from diameters of yarns that are on the order of 10 µm to 100 µm compared to lengths that can be as long as a kilometer). These small diameters of carbon nanofiber yarns along with the high tensile strength means that the at least two nanofiber yarns can be helically wrapped around one another many times, thus producing high torque and thus more charge per unit length compared to yarns made from other types of fibers. The high strength also means that carbon nanofibers can be repeatedly helically wound together with a lower likelihood of fracture. This is in contrast to many other types of fibers that cannot be repeatedly twisted or wound (e.g., Kevlar and conventional carbon fibers) without failing. Another benefit of using carbon nanofiber yarns include the resistance of carbon nanofiber yarns to corrosives, solvents, and high temperatures, unlike conventional natural fibers and synthetic, polymer-based fibers, and blends thereof, which are more likely to burn, dissolve, or degrade upon exposure to heat (e.g., greater than 100° C.), solvents, or corrosives. Still another benefit of using carbon nanofiber yarns includes their electrical conductivity. That is, as the carbon nanofibers themselves can be used to conduct the charge generated by the triboelectric effect so that it can be used productively as electricity.

However, some embodiments of a triboelectric generator need not use carbon nanofiber yarns. Other embodiments can use conventional natural and synthetic fiber yarns, whether cotton, nylon, polyester, linen, Kevlar, combinations thereof, and combinations thereof with carbon nanofibers, among others.

Regardless of the yarn composition, the plurality of inter-fiber spaces 508 defined by the plurality of fibers 504A-504D can be filled (or "infiltrated") with a triboelectric material (using, e.g., a solvent or other vehicle, as needed). This is schematically illustrated in FIG. 5B. The inter-fiber spaces 508 previously illustrated in FIG. 5A are shown in FIG. 5B as filled with a triboelectric material 512.

As described above, two yarns, respectively infiltrated with materials having opposite triboelectric affinities are helically wrapped together. Table 1 illustrates an example set of triboelectric materials presented in a triboelectric series. The greater the difference between oppositely signed values, the greater the charge generated when the two corresponding materials are placed in contact. For example, a triboelectric device made by contacting polyurethane and Teflon will produce more triboelectricity per cycle than a device made by contacting nitrile rubber with polycarbonate. However, even if contacting polyurethane and Teflon produces a strong electrical charge, it is challenging to collect and use the charge as an electrical current because both polyurethane and Teflon are electrical insulators. As indicated above, one embodiment of the present disclosure overcomes this challenge by using electrically conductive yarns (e.g., made from carbon nanofibers described herein) as a host for the triboelectric materials. The electrically conductive yarns can then conduct the triboelectrically generated charge so that it can be used as an electrical current.

| Material | Triboelectric Affinity (nC/J) |
|---|---|
| Polyurethane foam | +60 |
| Solid polyurethane, filled | +40 |
| Nylon | +30 |
| Nylatron (nylon filled with $MoS_2$) | +28 |
| Glass (soda) | +25 |
| Paper (uncoated copy) | +10 |
| GE brand Silicone II | +6 |
| Nitrile rubber | +3 |
| Polycarbonate | −5 |
| ABS | −5 |
| polymethyl methacrylate | −10 |
| Epoxy (circuit board) | −32 |
| Styrene-butadiene rubber | −35 |
| Solvent-based spray paints | −38 |
| PET | −40 |
| EVA rubber for gaskets, filled | −55 |
| Gum rubber | −60 |
| Hot melt glue | −62 |
| Polystyrene | −70 |
| Polyimide | −70 |
| Silicones (air harden & thermoset, but not GE) | −72 |
| Olefins (alkenes): LDPE, HDPE, PP | −90 |
| nitrate | −93 |
| UHMWPE | −95 |
| PVC (rigid vinyl) | −100 |
| Latex (natural) rubber | −105 |
| Viton, filled | −117 |
| Epichlorohydrin rubber, filled | −118 |
| Hypalon rubber, filled | −130 |
| Butyl rubber, filled | −135 |
| EDPM rubber, filled | −140 |
| Teflon (polytetrafluoroethylene) | −190 |

Figure 6A:
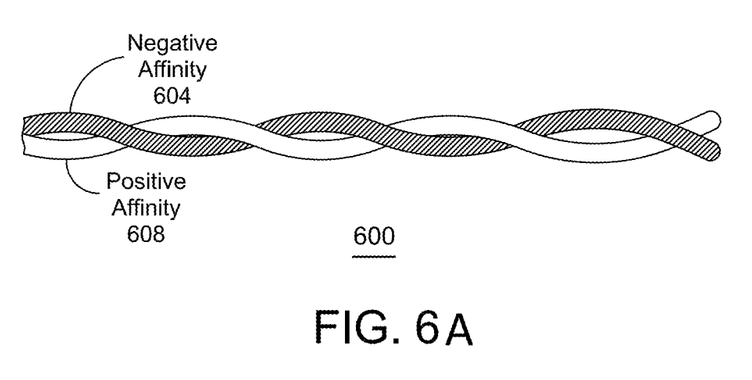
FIG. 6A schematically illustrates a portion of yarns of a triboelectric generator, in an embodiment.

FIG. 6A schematically illustrates a portion of yarns 600 of a triboelectric generator of the present disclosure. The portion of yarns 600 shown includes a first yarn 604 and a second yarn 608. Each of the yarns depicted in FIG. 6A has been filled with a triboelectric material.

In this example, the first yarn 604 is infiltrated with a first material having a negative triboelectric affinity and the second yarn is infiltrated with a second material having a positive triboelectric affinity. As shown, the first yarn 604 and the second yarn 608 are repeatedly helically wrapped around one another. This helical wrapping produces a large contact area between the two yarns 604 and 608, which in turn facilitates production of a large electrical charge (and current), as described herein.

It will be appreciated that yarns are only one embodiment in which materials having different triboelectric affinity can be brought together within a triboelectric generator of the present disclosure. Extruded strands of polymers filled with, or partially composed of, triboelectric materials may also be used.

Figure 6B:
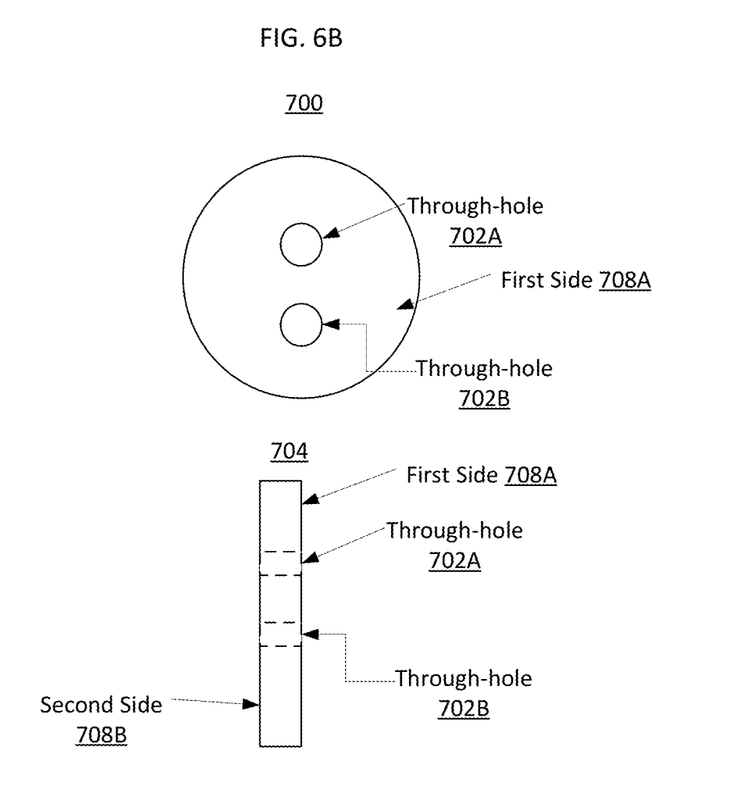
FIG. 6B schematically illustrates two side views, perpendicular to one another, of a disk 704, in an embodiment.

FIG. 6B schematically illustrates two side views, perpendicular to one another, of a disk 704 of the present disclosure. The disk 704 defines at least two through-holes 702A and 702B. The disk 704 also includes a first side 708A and a second side 708B.

Figure 7A:
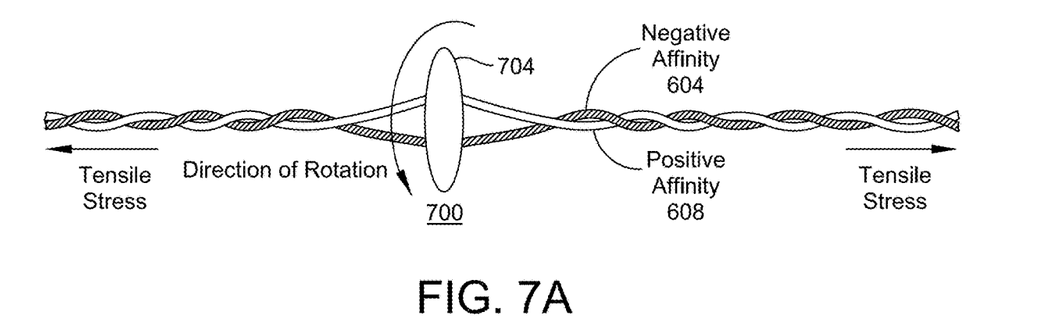
FIGS. 7A-7C are schematic illustrations of a triboelectric generator at various stages of use, in an embodiment.
Figure 7B:
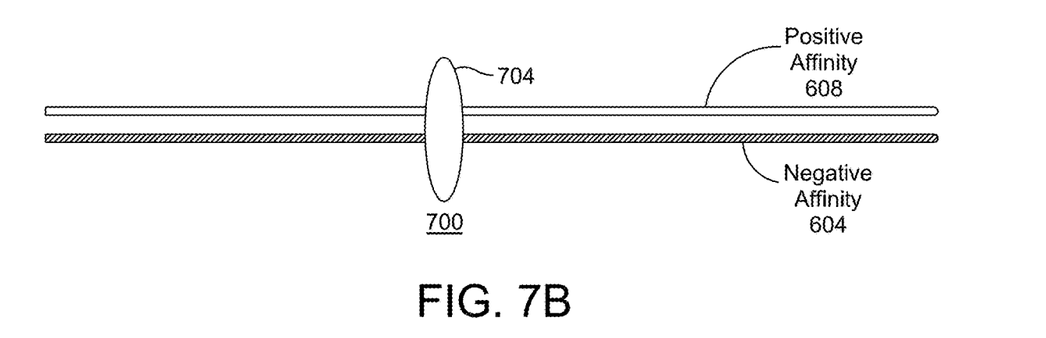
Figure 7C:
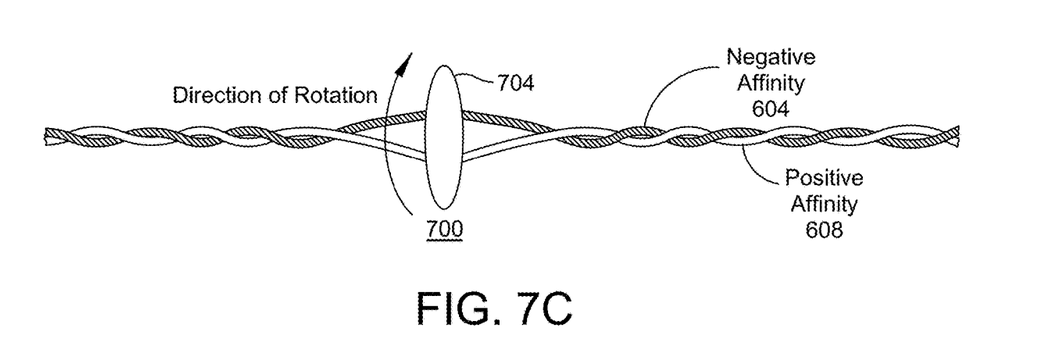

FIGS. 7A, 7B, and 7C are a schematic illustration of a triboelectric generator 700 at various stages of use, in an embodiment. The triboelectric generator 700 includes the yarns 604 and 608, described above in the context of FIG. 6, and the disk 704.

The yarns 604 and 608 are described above and need no further explanation.

The disk 704, which can be made from any convenient material (e.g., paper, wood, plastic, metal) defines at least two holes 702A and 702B, described above. The yarns 604 and 608 are each threaded or disposed through separate holes in the disk. In this way, both the first yarn 604 and the second yarn 608 have portions disposed within a corresponding hole, and extend from both of the first side and the second side of the disk 704.

It will be appreciated that in an alternative embodiment, each of the first yarn 604 and second yarn 608 can be divided into two portions. One portion of each of the first yarn 604 and 608 is attached (e.g., glued, stapled, or mechanically fixed) to the first side 708A of the disk 704. A second portion of each of the first yarn 604 and 608 is attached (e.g., glued, stapled, or mechanically fixed) to the first side 708B of the disk 704. The first embodiment in which the yarns 604 and 608 are disposed through the through-holes 702A and 702B will be described below for convenience and without loss of generality.

As also shown in FIG. 7A, the yarns 604 and 608 are wound together. As described above, a quantity of charge produced per cycle of operation (i.e., from the state depicted in FIG. 7A to the state depicted in FIG. 7B) is proportional to the number of revolutions the yarns make around one another (among other factors, including a difference in triboelectric affinity values between the first and second materials used to infiltrate the yarns 604 and 608, respectively). Smaller diameter yarns can be beneficial to use because the number of revolutions per unit length can be higher compared to larger diameter yarns. For example, carbon nanofiber yarns, or even carbon nanofiber and natural fiber (e.g., cotton or linen) yarn blends, can have diameters on the order of 30 μm. This is in contrast to conventionally composed yarns that generally have larger diameters (and also lack the strength, conductivity, and chemical resistance of carbon nanofibers). In one example, because carbon nanofiber yarns of the present disclosure have a diameter that is ⅓ that of a conventional yarn, the carbon nanofiber can be wound around another yarn approximately three more times than could a conventional yarn. For a given length of yarn this generates a proportionally greater amount of triboelectricity compared to a triboelectric generator using conventional natural or synthetic polymer fibers.

Regardless, after winding the yarns 604 and 608 together, a tensile stress is applied to opposing free ends of the helically twisted yarns 604 and 608, as indicated by the arrows in FIG. 7A. This tensile stress has the effect of causing the yarns 604 and 608 to unwind and causing the disk 704 to spin. Upon moving contact between the yarns 604 and 608 during this unwinding, triboelectricity is generated from contact between the first and second triboelectric materials used to infiltrate of fill the inter-fiber spaces between fibers within each of the yarns 604 and 608, as described above. For examples in which one or both of the yarns 604 and 608 is conductive, the triboelectricity can be conducted away as an electrical current. The sequence illustrated by FIGS. 7A-7C can be repeated for the continued generation of an electrical current.

Eventually, as shown in FIG. 7B, the yarns 604 and 608 are no longer twisted together. The tensile stress used to initiate and accelerate the unwinding illustrated in FIG. 7A can then be relaxed. However, the angular momentum of the disk 704 generated during the unwinding causes the yarns 604 and 608 to retwist. The unwinding can then re-occur in the opposite direction in a new cycle of triboelectricity generation, as shown in FIG. 7C.

Methods

Figure 8A:
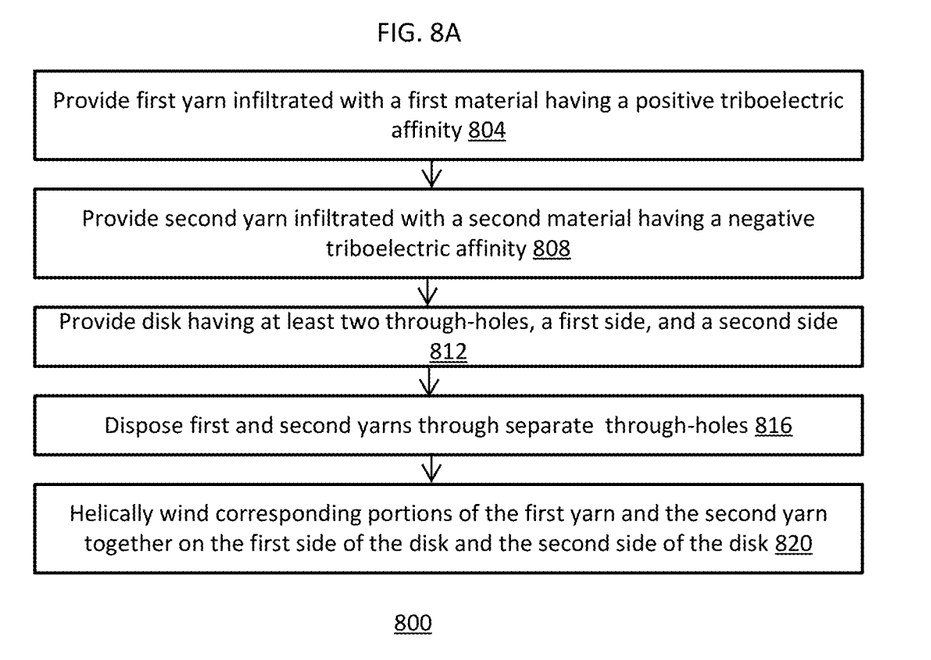
FIG. 8A is method flow diagram for an example method for fabricating a triboelectric generator, in an embodiment.

FIG. 8A illustrates an example method 800 for fabricating a triboelectric generator. The method 800 begins by providing 804 a first yarn and providing a second yarn 808, either of which can include a nanofiber yarn or a carbon nanofiber yarn. Fibers of the first yarn can define a first plurality of inter-fiber spaces and fibers of the second yarn can define a second plurality of inter-fiber spaces, such as those depicted in FIG. 5A. The first plurality of inter-fiber spaces can be filled or infiltrated with a first material having a positive triboelectric affinity and the second plurality of inter-fiber spaces can be filled or infiltrated with a second material having a negative triboelectric affinity. An example of this is schematically illustrated in FIG. 5B. A disk is then provided 812 that has a first side and a second side, the disk defining at least a first through-hole and a second through-hole. The first and second yarns are threaded or disposed 816 through separate through-holes so that portions of both of the yarns are disposed on both the first side and the second side of the disk. The yarns are then helically wound 820 around one another on both of the first side and the second side of the disk. In alternative embodiments, the yarns may be wound on a single side of the disk.

Figure 8B:
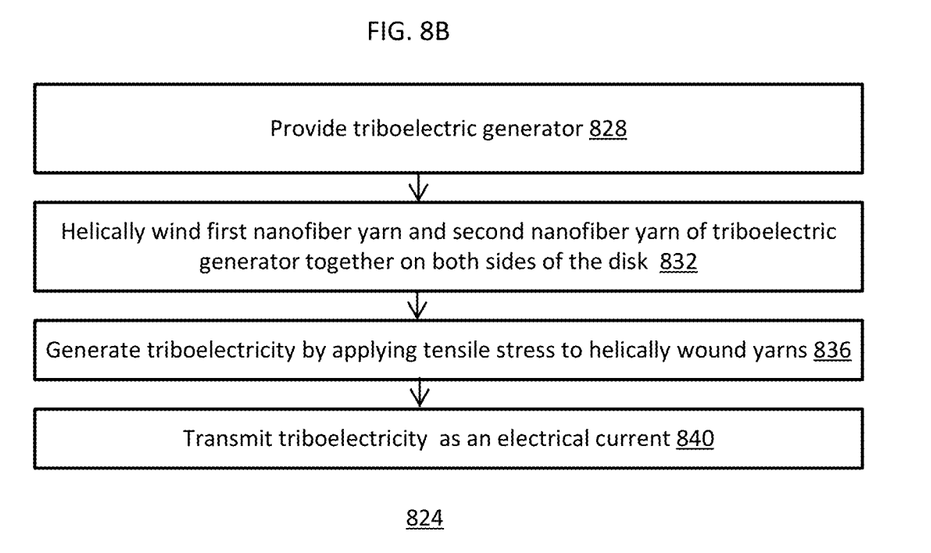

FIG. 8B illustrates and example method 824 of using a triboelectric generator. A triboelectric generator is provided 828. The triboelectric generator includes the disk and the first and second infiltrated yarns, as described above. The first and second infiltrated yarns are helically wound 832 together on one or both sides of the disk. A tensile stress is then applied 836 to the helically wound yarns, causing the yarns to unwind. This unwinding, as explained above, generates 836 triboelectricity. If one or both of the first and second yarns is conductive, this triboelectricity can be transmitted 840 as an electrical current. Each yarn may be electrically connected to an electric contact that enables the generated current to be sent to an electrical device such as a light, motor or computer, or to an electricity storage device, such as a battery or capacitor.

FURTHER CONSIDERATIONS

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A triboelectric generator comprising:
a disk having a first side and a second side, and at least a first through-hole and a second through-hole, wherein the disk creates a first space at the first side of disk and a second space at the second side of the disk;
a first nanofiber yarn passing through the first through-hole with one portion of the first nanofiber yarn positioned in the first space and another portion of the first nanofiber yarn positioned in the second space, the first nanofiber yarn comprising:
a first plurality of nanofibers defining a first plurality of inter-fiber spaces; and
a first material having a positive triboelectric affinity disposed within the first plurality of inter-fiber spaces;
a second nanofiber yarn passing through the second through-hole with one portion of the second nanofiber yarn position in the first space and another portion of the second nanofiber yarn positioned in the second space, the second nanofiber yarn comprising:
a second plurality of nanofibers defining a second plurality of inter-fiber spaces; and
a second material having a negative triboelectric affinity disposed within the second plurality of inter-fiber spaces,
wherein the portions of the first and the second nanofiber yarns in the first space are helically twisted together, and the portions of the first and second nanofiber yarns in the second space are helically twisted together, and
wherein end portions of both first and second nanofibers in the first and second spaces are pulled by an external tensile stress in opposite direction causing the disk to rotate and generating an electrical current.

2. The triboelectric generator of claim 1, wherein at least one of the first nanofiber yarn and the second nanofiber yarn is electrically conductive.

3. The triboelectric generator of claim 1, wherein at least some of the first plurality of nanofibers and the second plurality of nanofibers are carbon nanofibers.

4. The triboelectric generator of claim 1, wherein neither the first material or the second material are electrically conductive.

5. The triboelectric generator of claim 1, wherein the first material having a positive triboelectric affinity comprises a positive triboelectric affinity of at least 10 nano Coulombs per Joule.

6. The triboelectric generator of claim 1, wherein the first material having a positive triboelectric affinity comprises a positive triboelectric affinity of at least 25 nano Coulombs per Joule.

7. The triboelectric generator of claim 1, wherein the first material comprises polyurethane.

8. The triboelectric generator of claim 1, wherein the first material comprises soda glass.

9. The triboelectric generator of claim 1, wherein the second material having a negative triboelectric affinity comprises a negative triboelectric affinity of at least −10 nano Coulombs per Joule.

10. The triboelectric generator of claim 1, wherein the second material having a negative triboelectric affinity comprises a negative triboelectric affinity of at least −40 nano Coulombs per Joule.

11. The triboelectric generator of claim 1, wherein the second material comprises polyethylene terephthalate.

12. The triboelectric generator of claim 1, wherein the second material comprises polytetrafluroethylene.

13. A kit for a triboelectric generator comprising:
 a disk having a first side and a second side, and at least a first through-hole and a second through-hole, wherein the disk creates a first space at the first side of disk and a second space at the second side of the disk;
 a first nanofiber yarn passing through the first through-hole with one portion of the first nanofiber yarn positioned in the first space and another portion of the first nanofiber yarn positioned in the second space, the first nanofiber yarn comprising:
  a first plurality of nanofibers defining a first plurality of inter-fiber spaces; and
  a first material having a positive triboelectric affinity disposed within the first plurality of inter-fiber spaces;
 a second nanofiber yarn passing through the second through-hole with one portion of the second nanofiber yarn position in the first space and anther portion of the second nanofiber yarn positioned in the second space, the second nanofiber yarn comprising:
  a second plurality of nanofibers defining a second plurality of inter-fiber spaces; and
  a second material having a negative triboelectric affinity disposed within the second plurality of inter-fiber spaces,
 wherein the portions of the first and the second nanofiber yarns in the first space are helically twisted together, and the portions of the first and second nanofiber yarns in the second space are helically twisted together, and
 wherein end portions of both first and second nanofibers in the first and second spaces are pulled by an external tensile stress in opposite direction causing the disk to rotate and generating an electrical current.

14. The kit of claim 13, wherein at least one of the first nanofiber yarn and the second nanofiber yarn is electrically conductive.

15. The kit of claim 13, wherein at least some of the first plurality of nanofibers and the second plurality of nanofibers are carbon nanofibers.

16. The kit of claim 13, wherein neither the first material or the second material are electrically conductive.

17. A method for fabricating a triboelectric generator comprising:
 providing a first nanofiber yarn comprising:
  a first plurality of nanofibers defining a first plurality of inter-fiber spaces;
  a first material having a positive triboelectric affinity disposed within the first plurality of inter-fiber spaces;
 providing a second nanofiber yarn comprising:
  a second plurality of nanofibers defining a second plurality of inter-fiber spaces;
  a second material having a negative triboelectric affinity disposed within the second plurality of inter-fiber spaces;
 providing a disk having a first side and a second side, and at least a first through-hole and a second through-hole, wherein the disk creates a first space at the first side of disk and a second space at the second side of the disk;
 disposing the first nanofiber yarn to pass through the first through-hole with one portion of the first nanofiber yarn positioned in the first space and another portion of the first nanofiber yarn positioned in the second space;
 disposing the second nanofiber yarn to pass through the second through-hole with one portion of the second nanofiber yarn position in the first space and another portion of the second nanofiber yarn positioned in the second space;
 helically winding corresponding portions of the first nanofiber yarn and the second nanofiber yarn in the first space;
 helically winding corresponding portions of the first nanofiber yarn and the second nanofiber yarn in the second space; and
 pulling, by external tensile stress in opposite directions, end portions of both first and second nanofibers in the first and second spaces to cause the disk to rotate and generate an electrical current.

* * * * *

UNITED STATES PATENT AND TRADEMARK OFFICE
CERTIFICATE OF CORRECTION

Page 1 of 1

PATENT NO. : 10,978,965 B2
APPLICATION NO. : 15/957087
DATED : April 13, 2021
INVENTOR(S) : J. Lee It is certified that error appears in the above-identified patent and that said Letters Patent is hereby corrected as shown below:

On the Title Page

Item [57], Line 1, delete "include" and insert --includes--

In the Claims

Column 13, Line 31, Claim 13, delete "anther" and insert --another--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*